United States Patent [19]

Tokuda et al.

[11] Patent Number: 5,376,596
[45] Date of Patent: Dec. 27, 1994

[54] CONDUCTIVE PASTE

[75] Inventors: Yu Tokuda, Muko; Kunihiko Hamada, Kyoto, both of Japan

[73] Assignee: Murata Manufacturing Co., Ltd., Japan

[21] Appl. No.: 101,921

[22] Filed: Aug. 4, 1993

[30] Foreign Application Priority Data

Aug. 6, 1992 [JP] Japan .................................. 4-233166

[51] Int. Cl.$^5$ ............................ C03C 8/04; C03C 8/18
[52] U.S. Cl. ......................................... 501/19; 501/17; 501/20; 501/21; 501/26; 501/32; 501/79; 252/512; 106/1.12; 428/901; 428/699; 428/701; 428/704

[58] Field of Search ....................... 501/17, 26, 21, 19, 501/32, 79, 20; 252/512, 521; 106/1.12, 1.13, 1.14, 1.15; 428/901, 699, 704, 701

[56] References Cited

U.S. PATENT DOCUMENTS 4,496,875  1/1985  Barth et al. ........................ 106/1.12

Primary Examiner—Mark L. Bell
Assistant Examiner—C. M. Bonner
Attorney, Agent, or Firm—Ostrolenk, Faber, Gerb & Soffen

[57] ABSTRACT

A conductive paste contains at least a conductive powder and a glass frit. The glass frit includes 9.0 to 45.0 wt % of $SiO_2$ and 1.0 to 18.5 wt % of CaO, the balance being ZnO, $B_2O_3$ and $Li_2O$. The glass frit may contain not more than 6.0 wt % of $Al_2O_3$ incorporated therein as additive.

8 Claims, No Drawings

CONDUCTIVE PASTE

BACKGROUND OF THE INVENTION

1. Field of the Invention

The present invention relates to a conductive paste used for formation of thick film electrodes on terminals of electronic parts or substrates. More particularly, the present invention relates to a conductive paste for providing thick film electrodes of which the bonding strength is prevented from lowering by plating.

2. Description of the Prior Art

Recently, surface mounting has become the leading mainstream process for mounting electronic parts on substrates and the requirement for improvement in solderability of thick film electrodes of the parts has become strict. Such electrodes are usually produced by applying a conductive paste on substrates or terminals of electronic parts and then firing the substrates to remove organic components contained in the paste. The conductive paste used for this purpose is usually composed of a conductive powder (e.g., Ag) dispersed in an organic vehicle together with a glass frit containing lead oxide with a relatively low softening point as the addition of such a glass frit makes it possible to produce electrodes with superior adhesion strength.

On the other hand, the thick film electrodes are occasionally covered with a tin plating or solder plating to improve solderability of the electrodes formed on substrates or terminals of electronic parts. However, plating lowers the properties of thick film electrodes. For example, the electrodes made from a conductive paste contains 2 wt % of a glass frit consisting of 10.5 to 53.6 wt % of PbO, 10.7 to 31.9 wt % of $SiO_2$, 32.7 to 46.4 wt % of $B_2O_3$, 0 to 9.6 wt % of $ZrO_2$, and 0 to 42.7 wt % of ZnO, have adhesion strength of about 15 kgf before plating, but after plating the adhesion strength is lowered to 2.0 kgf or below and the electrodes are peeled off from the substrates under certain circumstances.

To solve such problems, it has been proposed to use a lead borosilicate glass fit containing one or more alkaline metals. However, the glass phases containing lead oxide are eroded easily by an electroless plating solution, resulting in failure in effective improvement in adhesion strength of electrodes.

SUMMARY OF THE INVENTION

It is therefore an object of the present invention to provide a conductive paste which overcomes the aforesaid disadvantages and enables provision of thick film electrodes on substrates or terminals of electronic parts, having high adhesion strength even after plating.

According to the present invention, the above and other objects are achieved by incorporating a glass frit including 9.0 to 45.0 wt % of $SiO_2$ and 1.0 to 18.5 wt % of CaO, the balance being ZnO, $B_2O_3$ and $Li_2O$, into a conductive paste containing at least a conductive powder. Preferably, the glass frit has a composition consisting essentially of 9.0 to 45.0 wt % of $SiO_2$, 1.0 to 18.5 wt % of CaO, 2 to 40 wt % of ZnO, 30 to 52 wt % of $B_2O_3$, and 1.5 to 10 wt % of $Li_2O$.

The conductive paste may further contain not more than 6.0 wt % of $Al_2O_3$. Thus, according to the present invention, there is also provided a conductive paste containing a glass frit which includes 9.0 to 45.0 wt % of $SiO_2$, 1.0 to 18.5 wt % of CaO, and not more than 6.0 wt % of $Al_2O_3$, the balance being ZnO, $B_2O_3$, and $Li_2O$. Preferably, the glass frit has a composition consisting essentially of 9.0 to 45.0 wt % of $SiO_2$, 1.0 to 18.5 wt % of CaO, not more than 6.0 wt % of $Al_2O_3$, 2 to 40 wt % of ZnO, 30 to 52 wt % of $B_2O_3$, and 1.5 to 10 wt % of $Li_2O$.

As a material for the conductive powder, there may be used those such as Ag, Ag—Pd alloy, Ni, Cu and any conventionally used metals or alloys. If the conductive powder is of copper, it is preferred to use copper powder which is free from oxidation and has a particle size of 0.1 to 5 $\mu$m.

As a material for the substrate, there may be used those such as alumina, dielectric ceramics, piezoelectric ceramics, and other the like.

Preferably, the conductive paste contains a solid component composed of 0.5 to 8.0 wt % of glass frit and the balance being conductive powder. If the content of glass frit is less than 0.5% by weight, it is difficult to improve the adhesion strength between the electrode and the substrate. If the content of the glass frit exceeds 8% by weight, the conductive paste can not be put into practical use as the solderability of the electrodes becomes considerably lowered.

These and other objects and features of the present invention will become clear from the following examples.

EXAMPLES

Using ZnO, $H_3BO_3$, $SiO_2$, $Li_2CO_3$, $TiO_2$, $ZrO_2$, $CaCO_3$, $Na_2CO_3$, $Al_2O_3$ as raw materials, there were prepared glass frits in the following manner: The raw materials were weighed and mixed so as to prepare glass fits each having a composition shown in Table 1. Each of the resultant mixture was fused at 1300° C. and then put into water to make the melt a vitreous material by rapid cooling. The resultant vitreous material was ground into frit having a mean particle size of about 3 $\mu$m.

Then, the resultant glass frit was mixed with Ag powder and an organic vehicle to prepare a conductive paste consisting of 70.0 wt % of Ag powder, 28.0 wt % of an organic vehicle, and 2.0 wt % of the glass frit. The organic vehicle used consists of 8 wt % of ethyl cellulose and 92 wt % of $\alpha$-terpineol.

Using a screen of 125 meshes of diameter 3.5 mm, each conductive paste was screen-printed on alumina substrates of 5 mm $\times$ 5 mm and then fired at 800° C. for 10 minutes to form specimen with thick film electrodes provided on the substrates.

For each specimen, the adhesion strength of the electrode was measured after tin plating. The tin plating was carried out by immersing the specimen in an electroless tin plating bath with pH 5.5 at 40° C. for 60 minutes to deposit a tin layer with a thickness of about 3 $\mu$m on the electrodes. In this case, the specimens were put into a perforated barrel having about 5000 steel balls of diameter 2.0 mm as media and being adapted to be rotated in the bath. Results are shown in Table 1.

In Table 1, the adhesion strength is given as the maximum value of an external force required for peeling off the electrode in the direction normal to the surface of the electrodes. Also, the asterisked specimen are those beyond the scope of the present invention.

COMPARATIVE EXAMPLES

Using $Pb_3O_4$, $SiO_2$, $ZrO_2$, ZnO and $H_3BO_3$ as raw materials, there were prepared lead borosilicate glass frits each having a composition shown in Table 2 in the same manner as above.

Each of the glass frits was mixed with Ag powder and an organic vehicle composed of 8 wt % of ethyl cellulose and 92 wt % of α-terpineol to prepare a conductive paste consisting of 70.0 wt % of Ag powder, 28.0 wt % of an organic vehicle, and 2.0 wt % of the glass frit. The resultant conductive paste was applied on alumina substrates in the same manner as above to prepare specimens. For each specimen, the adhesion strength of the electrode was measured before and after tin plating. Results are shown in Table 2.

TABLE 1

| No. | Composition of glass frot (wt %) | | | | | | | | | Adhesion strength (kgf) after plating |
|---|---|---|---|---|---|---|---|---|---|---|
| | ZnO | B₂O₃ | SiO₂ | Li₂O | TiO₂ | ZrO₂ | CaO | NaO | Al₂O₃ | |
| 1* | 37.1 | 52.3 | 9.2 | 1.4 | — | — | — | — | — | 4.3 |
| 2* | 37.2 | 50.2 | 9.4 | 1.4 | 1.8 | — | — | — | — | 2.3 |
| 3* | 37.4 | 42.3 | 9.4 | 1.5 | 9.4 | — | — | — | — | 3.8 |
| 4* | 38.0 | 32.0 | 9.5 | 1.5 | 19.0 | — | — | — | — | 4.3 |
| 5* | 37.2 | 50.3 | 9.3 | 1.4 | — | 1.8 | — | — | — | 4.1 |
| 6* | 37.4 | 42.3 | 9.4 | 1.5 | — | 9.4 | — | — | — | 1.9 |
| 7 | 37.5 | 50.6 | 9.3 | 1.5 | — | — | 1.1 | — | — | 7.2 |
| 8 | 39.1 | 44.1 | 9.8 | 1.5 | — | — | 5.5 | — | — | 8.7 |
| 9* | 37.5 | 42.3 | 9.4 | 1.5 | — | — | — | 9.3 | — | 1.0 |

| No. | Composition of glass frot (wt %) | | | | | | | Adhesion strength (kgf) After plating |
|---|---|---|---|---|---|---|---|---|
| | ZnO | B₂O₃ | SiO₂ | Li₂O | TiO₂ | CaO | Al₂O₃ | |
| 10 | 30.5 | 44.1 | 18.4 | 1.5 | — | 5.5 | — | 9.2 |
| 11 | 23.1 | 44.1 | 25.8 | 1.5 | — | 5.5 | — | 10.0 |
| 12 | 13.0 | 44.1 | 35.9 | 1.5 | — | 5.5 | — | 12.2 |
| 13 | 15.0 | 45.9 | 26.8 | 1.6 | — | 10.7 | — | 12.0 |
| 14* | 2.2 | 48.7 | 28.4 | 1.7 | — | 19.0 | — | Not vitrified |
| 15 | 22.7 | 45.9 | 19.1 | 1.6 | — | 10.7 | — | 10.8 |
| 16 | 15.0 | 45.9 | 26.8 | 1.6 | — | 10.7 | — | 13.2 |
| 17 | 2.4 | 32.0 | 43.7 | 9.7 | — | 12.2 | — | 14.2 |
| 18 | 2.4 | 31.7 | 43.2 | 9.6 | — | 10.8 | 2.3 | 11.5 |
| 19 | 2.3 | 31.2 | 42.6 | 9.5 | — | 8.8 | 5.6 | 13.6 |
| 20* | 2.3 | 31.0 | 42.4 | 9.4 | — | 7.9 | 7.0 | Not vitrified |

TABLE 2

| No. | Composition of glass frot (wt %) | | | | | Bond strength (kgf) | |
|---|---|---|---|---|---|---|---|
| | PbO | SiO₂ | ZrO₂ | ZnO | B₂O₃ | Before plating | After plating |
| 21* | 53.6 | — | — | — | 46.4 | 10.8 | 1.7 |
| 22* | 52.3 | — | 2.0 | — | 45.7 | 14.2 | 0.5 |
| 23* | 47.0 | — | 9.6 | — | 43.4 | 15.2 | 1.8 |
| 24* | 40.2 | 17.8 | 1.8 | — | 40.2 | 7.0 | 0.8 |
| 25* | 36.1 | 17.0 | 8.5 | — | 38.4 | 5.1 | 0.5 |
| 26* | 30.6 | 31.9 | 1.6 | — | 35.9 | 11.5 | 2.0 |
| 27* | 27.4 | 30.6 | 7.6 | — | 34.4 | 15.0 | 0.5 |
| 28* | 31.5 | 16.1 | — | 16.1 | 36.3 | 8.2 | 0.9 |
| 29* | 23.7 | 14.5 | — | 29.1 | 32.7 | 13.7 | 0.5 |
| 30* | 10.5 | 10.7 | — | 42.7 | 36.1 | 13.5 | 1.9 |

As will be understood from the data for specimens Nos. 7-8, 10-13 and 15-19, the thick film electrodes made from the conductive paste of the present invention have high adhesion strength ranging from 7.2 to 14.2 kgf even after plating.

In contrast therewith, the comparative specimens Nos. 21 to 30 made from the conductive paste containing lead borosilicate glass frit are considerably lowered in adhesion strength by plating.

On the other hand, the observation of the specimens Nos. 7-8, 10-13, and 15-19, which have been broken to several pieces, showed that a good many glass phase remains between the boundary layer between the substrate and electrode. This means that the glass phases in the electrodes are almost never eroded by the plating bath. In contrast therewith, erosion of the glass phases was observed at the boundary layer of the between the substrate and electrode of the specimens Nos. 21-30. This causes lowering of adhesion strength of electrodes.

The reasons why the contents of additive components, CaO, Li₂O and Al₂O₃ have been limited to the above respective ranges are as follows: Calcium oxide CaO is incorporated into a basic composition of a zinc borosilicate glass frit to prevent the electrodes from lowering of adhesion strength caused by plating. If the content of CaO is less than 1.0 wt %, it is difficult to improve the adhesion strength of the electrodes. If the content of CaO exceeds 18.5 wt %, the melting point of the glass is considerably increased, thus making it difficult to vitrify the composition. Thus, the content of CaO has been limited to a value ranging from 1.0 to 18.5 wt %.

Lithium oxide is incorporated into the basic composition of the zinc borosilicate glass frit to make it easy to vitrify the glass composition. If the content of Li₂O is less than 1.5 wt %, it has no effect on the vitrification of the glass composition. If the content of Li₂O exceeds 10 wt %, it causes insulation defect.

Alumina is incorporated into the basic composition of the zinc borosilicate glass frit to improve resistance to plating as occasion demands. However, if the content of Al₂O₃ exceeds 6.0 wt %, the glass composition is not vitrified like as specimen No. 20.

The basic composition of the zinc borosilicate glass frit consists essentially of 2 to 40 wt % of ZnO, 9.0 to 45.0 wt % of SiO₂, and 30 to 52 wt % of B₂O₃. If the content of SiO₂ is less than 9.0 wt %, it is difficult to produce a uniform vitreous phase. If the content of SiO₂ exceeds 40.0 wt %, the softening point is considerably increased and the production of the glass frit requires addition of a considerably large amount of Li₂O exceeding 10 wt %. The contents of the remaining two basic components ZnO and $B_2O_3$ have been limited to the above range for the same reasons as those for $SiO_2$.

In the above embodiment, the tin plating is applied to the electrodes made from the conductive paste of the present invention. Similar effects can be obtained even when any other metal plating is applied to the electrodes made from the conductive paste of the present invention.

Although the present invention has been fully described in connection with the preferred embodiments thereof, it is to be noted that various changes and modifications are apparent to those skilled in the art. Such changes and modifications are to be understood as included within the scope of the present invention as defined by the appended claims unless they depart therefrom.

What is claimed is:

1. A conductive paste comprising a metal conductive powder and a glass frit, wherein said glass frit consists essentially of 9.0 to 45.0 wt % of $SiO_2$, 1.0 to 18.5 wt % of CaO, 2 to 40 wt % of ZnO, 30 to 52 wt % of $B_2O_3$, and 1.5 to 10 wt % of $Li_2O$, and wherein said glass frit does not exceed 8% of the paste solids.

2. The conductive paste of claim 1 wherein said glass frit is 0.5–8% of the solid component thereof.

3. A product comprising a substrate carrying a thick film electrode which is the fixed conductive paste of claim 1.

4. The product of claim 3 in which the substrate is an electronic part terminal.

5. A conductive paste comprising a metal conductive powder and a glass frit, wherein said glass frit consists essentially of 9.0 to 45.0 wt % of $SiO_2$, 1.0 to 18.5 wt % of CaO, more than 0 but not more than 6.0 wt % of $Al_2O_3$, 2 to 40 wt % of ZnO, 30 to 52 wt % of $B_2O_3$, and 1.5 to 10 wt % of $Li_2O$, and wherein said glass frit does not exceed 8% of the paste solids.

6. The conductive paste of claim 5 wherein said glass frit is 0.5–8% of the solid component thereof.

7. A product comprising a substrate carrying a thick film electrode which is the fired conductive paste of claim 5.

8. The product of claim 7 in which the substrate is an electronic part terminal.

* * * * *